(12) United States Patent
Heister

(10) Patent No.: US 12,008,097 B2
(45) Date of Patent: Jun. 11, 2024

(54) FIRE CONTROL SYSTEM AUTHENTICATION

(71) Applicant: Novar GmbH, Neuss (DE)

(72) Inventor: Henning Heister, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 261 days.

(21) Appl. No.: 17/449,378

(22) Filed: Sep. 29, 2021

(65) Prior Publication Data

US 2022/0100842 A1    Mar. 31, 2022

(30) Foreign Application Priority Data

Sep. 30, 2020  (DE) .......................... 102020125570.5

(51) Int. Cl.
```
G08B 25/08      (2006.01)
G06F 21/31      (2013.01)
G06F 21/33      (2013.01)
G06F 21/44      (2013.01)
G08B 17/00      (2006.01)
H04L 9/32       (2006.01)
H04L 9/40       (2022.01)
H04W 12/06      (2021.01)
```

(52) U.S. Cl.
CPC .............. *G06F 21/44* (2013.01); *G06F 21/33* (2013.01); *G06F 2221/2137* (2013.01)

(58) Field of Classification Search
CPC .......... G06F 21/44; G06F 21/33; G06F 21/31; G06F 2221/2137; G08B 25/08; G08B 17/00; H04L 9/3268; H04L 9/3213; H04L 9/3247; H04L 9/32; H04L 2463/082; H04L 63/0807; H04L 63/0823; H04L 63/083; H04L 63/126; H04W 12/06
See application file for complete search history.

(56) References Cited

U.S. PATENT DOCUMENTS

| | | | |
|---|---|---|---|
| 9,537,865 B1 | 1/2017 | Borovoy et al. | |
| 10,122,719 B1 | 11/2018 | Vltavsky | |
| 10,505,916 B2 | 12/2019 | Engan | |
| 10,776,474 B2 * | 9/2020 | Ekberg | .................. H04W 12/35 |

(Continued)

FOREIGN PATENT DOCUMENTS

| | | |
|---|---|---|
| CN | 105378744 | 3/2016 |
| CN | 106856476 | 6/2017 |

(Continued)

OTHER PUBLICATIONS

Revocable and Offline-Verifiable Self-Sovereign Identities, by More et al., published 2020 IEEE 19th International Conference on Trust, Security and Privacy in Computing and Communications (TrustCom). (Year: 2020).*

(Continued)

*Primary Examiner* — Vu V Tran
(74) *Attorney, Agent, or Firm* — Brooks, Cameron & Huebsch, PLLC

(57) ABSTRACT

Methods, systems, and devices for fire control system authentication are described herein. One method includes authenticating a user device to an authentication server, receiving, from the authentication server, an offline token, and authenticating the user device to a fire control panel using the offline token.

19 Claims, 3 Drawing Sheets

(56) References Cited

U.S. PATENT DOCUMENTS

| | | | |
|---|---|---|---|
| 2004/0041019 A1* | 3/2004 | Schneider | G06F 21/32 |
| | | | 235/382 |
| 2013/0214898 A1 | 8/2013 | Pineau et al. | |
| 2013/0283362 A1 | 10/2013 | Kress | |
| 2014/0075513 A1 | 3/2014 | Trammel et al. | |
| 2014/0331060 A1 | 11/2014 | Hayton | |
| 2016/0191520 A1 | 6/2016 | Voice et al. | |
| 2017/0076585 A1 | 3/2017 | El-Mankabady et al. | |
| 2017/0102693 A1 | 4/2017 | Kidd | |
| 2017/0163636 A1 | 6/2017 | Nishida | |
| 2018/0367307 A1* | 12/2018 | Ekberg | H04L 63/102 |
| 2019/0068588 A1* | 2/2019 | Inabe | H04L 63/0807 |
| 2019/0172163 A1 | 6/2019 | Lerick et al. | |
| 2020/0177589 A1* | 6/2020 | Mangalvedkar | H04W 4/50 |
| 2021/0021601 A1* | 1/2021 | Valecha | H04L 9/0872 |
| 2022/0223029 A1* | 7/2022 | Mandelkau | G08B 25/14 |

FOREIGN PATENT DOCUMENTS

| | | |
|---|---|---|
| CN | 108521333 | 9/2018 |
| CN | 109639692 | 4/2019 |
| CN | 111213339 | 5/2020 |
| EP | 3460694 A1 | 3/2019 |
| EP | 3175414 B1 | 7/2020 |

OTHER PUBLICATIONS

Offline Hardware/Software Authentication for Reconfigurable Platforms by Simpson et al., published 2006 (Year: 2006).*
Fan, Kai [et al.], "Adaptive sensing private property protection protocol based on cloud." In: International Journal of Distributed Sensor Networks, vol. 11, 2015, Nr. 11, Article ID 743580. DOI: 10.1155/2015/743580.
Ravidas, et al., "Access Control in Internet-of-Things: A Survey", Elsevier, Journal of Network and Computer Applications, Jul. 3, 2019 (23 pgs).
Seitz, et al., "Authorization for the Internet of Things using OAuth 2.0"; Internet Draft, Dec. 21, 2015 (49 pgs) https://datatracker.ietf.org/doc/pdf/draft-ietf-ace-oauth-authz-00.
Combined Search and Examination Report under Sections 17 and 18(3) with Written Opinion for related GB Application No. 2113607.2, dated Jun. 7, 2022 (12 pgs total).

* cited by examiner

FIRE CONTROL SYSTEM AUTHENTICATION

CROSS-REFERENCE TO RELATED APPLICATIONS

This application claims priority pursuant to 35 U.S.C. 119(a) to German Patent Application No. 102020125570.5, filed Sep. 30, 2020, which application is incorporated herein by reference in its entirety.

TECHNICAL FIELD

The present disclosure relates generally to methods, systems, and devices for fire control system authentication.

BACKGROUND

Large facilities (e.g., buildings), such as commercial facilities, office buildings, hospitals, and the like, may have a fire control system that can be triggered during an emergency situation (e.g., a fire) to warn occupants to evacuate. For example, a fire control system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms.

Access to a fire control panel may be desired for system maintenance, configuration, and other tasks. Some system operations may be performed using an application or tool implemented on a user device that communicates with the panel and with a distributed network (e.g., a cloud). A user (e.g., an engineer or technician) attempting to access a fire control panel may be prompted for authentication to ensure that the user is authorized access.

Previous approaches may not be able to authorize and/or authenticate a user or a user device in the absence of an Internet connection. However, fire control panels may themselves not be connected to the internet or may be located in an area with little or no connectivity.

DETAILED DESCRIPTION

Figure 1:
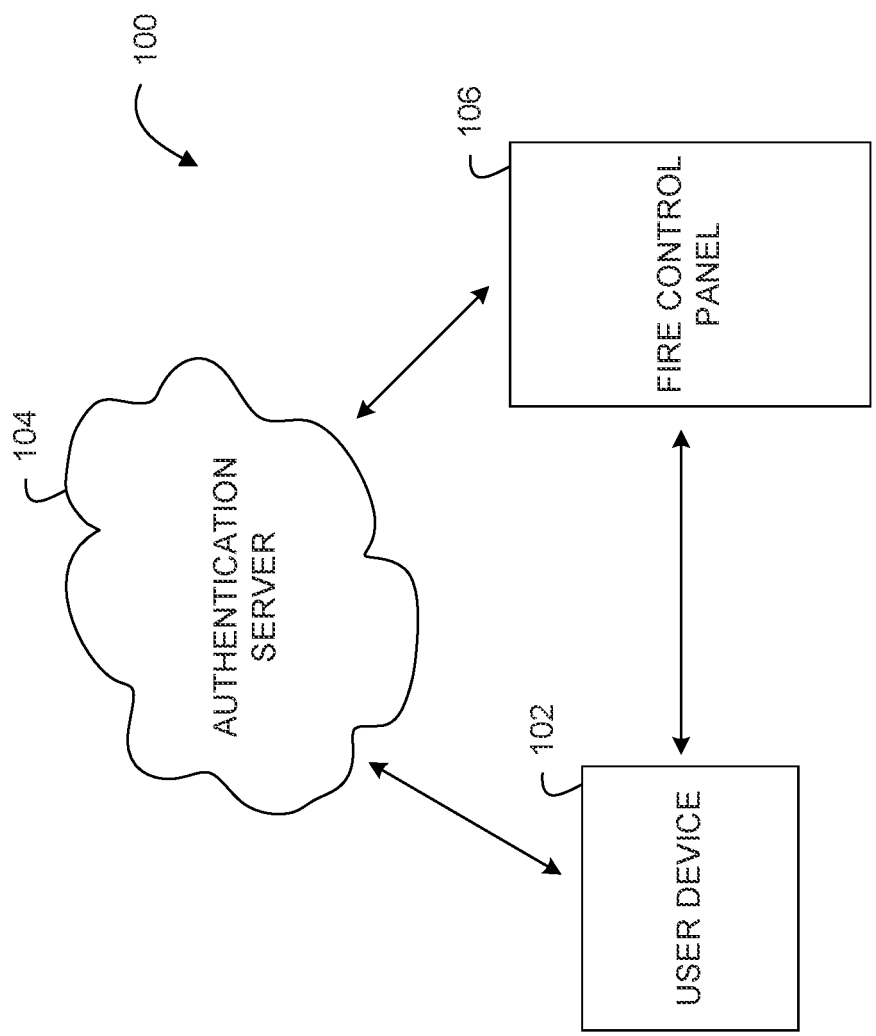
FIG. 1 illustrates a system for fire control system authentication in accordance with one or more embodiments of the present disclosure.

Systems, methods, and devices for fire control system authentication are described herein. For example, an embodiment includes authenticating a user device to an authentication server, receiving, from the authentication server, an offline token, and authenticating the user device to a fire control panel using the offline token.

Embodiments of the present disclosure allow the use of a cloud solution for authentication and authorization, including the management of users, for a limited period of time in environments without Internet access. In a user (e.g. operator, electronic security device admin, facility manager, technician, etc.) is authenticated and authorized, a particular token (referred to herein as an "offline token") can be securely stored on a device associated with the user (referred to herein as "user device"). With this token, the user's cloud account can be used for authentication and authorization to a different device that has no internet connection. The present disclosure makes reference to the example of a fire control panel as a device to which a user device can be authenticated and authorized in the absence of an Internet connection, though it is noted that the present disclosure is not so limited.

Once the user has completed a successful user login, the user's identity can be confirmed by a cloud server (referred to herein as an "authentication server") and the rights granted to the user can be securely stored in the offline token on the user device. The offline token can be used to authenticate against a fire control panel without an internet connection. The state of being without an Internet connection may be referred to herein as "offline." As such, a device may be said to be offline when it is not connected to the Internet.

As described further herein, the offline token may be granted with an operational lifetime. Stated differently, the offline token may allow authentication to an offline fire control panel only for a particular period of time. In some embodiments, the period of time is a number of days. For example, the period of time may be 7 days, though the present disclosure is not so limited. Accordingly, users and their rights can be managed centrally (e.g., in the cloud) but can function for periods of time in the absence of a connection to the cloud.

As used herein, the term "authentication" can be used to refer to an authorization, approval, key or signature in addition to its commonly understood meaning. In accordance with the present disclosure, an authentication can be performed in a multitude of ways. These can include, but are not limited to entering a password or code using some form of a screen or keypad, scanning, reading, or inserting a physical key, facial recognition, and biometric inputs, such as scanning a portion of a finger.

As described herein, users can enter input through a multitude of ways. These can include, but are not limited to, typing on a physical keyboard, pushing buttons on a device, typing on screen, drawing or writing on a screen using a finger or other appropriate device, speaking into device, and using a mouse to select an input.

As used herein, the term "certificate" is synonymous with the term "electronic certificate" and can refer to a set of data that enables the identification of a user. This set of data can include, but is not limited to: a user's fingerprint, a passcode, or data identifying a user's physical key. The data contained in a user's certificate can be referred to as "authentication data". When an authentication is received from a user and matches one or more of the authentication data points of the electronic certificate for that user, a token can be electronically signed to show that it was authenticated.

As used herein, the term "application" can refer to an application accessed through a user device. An "application" as described herein can also be accessed via a network or via the web.

As used herein, the term "user device" can refer to any device accessed by a user capable of communication with the cloud and with a fire control panel. This can include, but is not limited to, cell phones (e.g., smart phones), tablets, and portable computers.

As used herein, a "network" can provide a communication system that directly or indirectly links two or more computer and/or mobile devices and allows users to access resources or other computing devices and exchange messages with other users. A network can allow users to share resources on their own systems with other network users and to access information on centrally located systems or on systems that are located at remote locations. For example, a network can tie a number of devices together to form a distributed control network (e.g., a cloud).

A network may provide connections to the Internet and/or to the networks of other entities (e.g., organizations, institutions, etc.). Users may interact with network-enabled software applications to make a network request. Applications may also communicate with network management software, which can interact with network hardware to transmit information between devices on the network.

As used herein, the term "cloud", or distributed control network, can be used to refer to a server and/or computing device working in conjunction with other computing resources (hardware, software, logic, memory, processor, etc.) that can be used as a service over a communications network (in a wired and/or wireless manner over the internet). The server, computing device, and other computing resources can all be referred to as being part of the "cloud".

As referred to herein, a "memory" can be any type of storage medium that can be accessed by a processor to perform various examples of the present disclosure. For example, a memory can be a non-transitory computer readable medium having computer readable instructions (e.g., computer program instructions) stored thereon that are executable by a processor to perform various examples of the present disclosure. That is, a processor can execute the executable instructions stored in a memory to perform various examples in accordance with the present disclosure.

Memory can be volatile or nonvolatile. Memory can also be removable (e.g., portable) memory, or non-removable (e.g., internal) memory. For example, memory can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a", "an", or "a number of" something can refer to one or more such things, while "a plurality of" something can refer to more than one such things. For example, "a number of devices" can refer to one or more devices, while "a plurality of devices" can refer to more than one device.

FIG. 1 illustrates a system 100 for fire control system authentication in accordance with one or more embodiments of the present disclosure. The fire control system can be the fire control system of a facility (e.g., building), such as, for instance, a large facility having a large number of floors, such as a commercial facility, hospital, office building, and the like. However, embodiments of the present disclosure are not limited to a particular type of facility. The fire control system may include a number of components located throughout the facility (e.g., on different floors of the facility). For example, a fire control system may include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components.

The system 100 (and a fire control system) can include a physical fire control panel (e.g., box) 106 installed in the facility that can be used by a user to directly control the operation of the components of the fire control system. The system 100 can include a user device 102 and an authentication server 104.

The user can log in to an operating system of the user device 102 and/or an application executed by the user device 102. Such an application may be referred to herein as a configuration tool, though such usage is employed only for purposes of example and discussion. For instance, the user device 102 can be used by a user (e.g., maintenance technician or operator) to perform inspections, maintenance, and/or upgrades, among other operations, on a fire control system (e.g., on the components of the fire control system) of a facility. For instance, the user may connect the user device 102 to the fire control panel 106 of the fire control system, and the user device 102 can communicate with the fire control panel 106 to perform the tasks of the operation.

If the configuration tool has an Internet connection, the configuration tool can redirect the user to the authentication server 104. In some embodiments, the authentication server can employ an authentication layer on top of an authorization framework (e.g., OpenID Connect (OIDC). A login can be presented to the user, via the user device 102, by the authentication server 104. In some embodiments, the authentication can be multifactor authentication. The user, via the user device 102, can send user credentials to the authentication server 104. The authentication server 104 can send an access token, an identification token, and, in some embodiments, a refresh token to the configuration tool. In some embodiments, the above steps may complete the authentication process with OIDC.

After successful authentication, the configuration tool can request a new offline token. The configuration tool can use the access token and/or the identification token to authenticate against a web application programming interface (API). In some embodiments, the web API can be independent of the authentication server 104. In some embodiments, the web API can be stored and/or provided by the authentication server 104. The web API can use the authentication server 104 to validate the right to access the web API. The web API can check the access token and/or the identification token for validity. If the authentication is successful, the web API can create the offline token. The offline token is then signed with a digital certificate associated with an entity managing the control panel 106. The configuration tool can receive the offline token with the certificate and a certificate revocation list (e.g., from a Public Key Infrastructure (PKI) system issuing certificates herein). In some embodiments, the received certificate includes only the public key. The user device 102 can store (e.g., in secure storage) the offline token. In some embodiments, the user device 102 may perform encryption on the token in association with the user credentials (e.g., the credentials of the user device).

The offline token can include a name associated with a user of the user device 102. The offline token can include an address (e.g., an email address) associated with a user of the user device 102. The offline token can include an identifier (e.g., user ID) associated with a user of the user device 102. The offline token can include a role associated with a user of the user device 102. The offline token can include an entity employing the user of the user device 102. The offline token can include an indication of an ability for the user to designate an entity allowed to perform operations of the panel 106.

The role associated with the user of the user device 102 can indicate an ability for the user to modify a time setting associated with the panel 106. The role associated with the user of the user device 102 can indicate an ability for the user to view an event log associated with the panel 106. The role associated with the user of the user device 102 can indicate an ability for the user to modify configuration data of the fire control panel 106 and devices of a fire control network to which the fire control panel 106 belongs.

Once the offline token is received and stored by the user device 102, the user device 102 can connect to the panel 106. As previously discussed, the offline token can allow the connection to occur in the absence of an Internet connection. The configuration tool of the user device 102 can call the panel 106 via a secure communication (e.g., using Hyper Text Transfer Protocol Secure (HTTPS). A cryptographic protocol (e.g., Transport Layer Security (TLS) 1.2) can be used to authenticate the panel (acting as a server) against the configuration tool (acting as a client). The configuration tool can retrieve the offline token and the certificate revocation list from storage and send the offline token and the certificate revocation list to the panel 106 for authentication against the panel 106. With this token, the panel 106 can additionally determine the operational lifetime of the offline token and the rights of the user based on the roles therein. The panel 106 can grant the configuration tool the appropriate permissions and/or deny access. If the authentication was successful and the panel 106 was offline during the authentication process, the panel 106 can verify the signing. In some embodiments, the signing is verified using the public key from the offline token API, which can be considered to be valid if it has not been revoked (e.g., if it is not on the revocation list). Thereafter, the user, via the configuration tool, can modify operations of the panel 106 and/or devices (e.g., fire alarms) of the system of which the panel 106 is a part.

In some cases, the panel 106 may have an Internet connection. In some embodiments where an Internet connection is available, the panel 106 can use an access delegation mechanism (e.g. OAuth flow "Password credentials") to authenticate against the authentication server 104.

If the panel 106 is online and successfully authenticated, the authentication server 104 can send an access token to the panel 106. Such an access token can allow the panel 106 to use services from the web API. If the configuration tool sends an offline token to the panel 106 while the panel 106 is online and authenticated, the panel 106 can use the web API to verify the validity of the offline token from the configuration tool. The web API can send a determination regarding the validity of the offline token to the panel 106. If valid, the user, via the configuration tool, can modify operations of the panel 106 and/or devices (e.g., fire alarms) of the system of which the panel 106 is a part. The certificate revocation list can be updated online (e.g., using TLS certification revocation).

Figure 2:
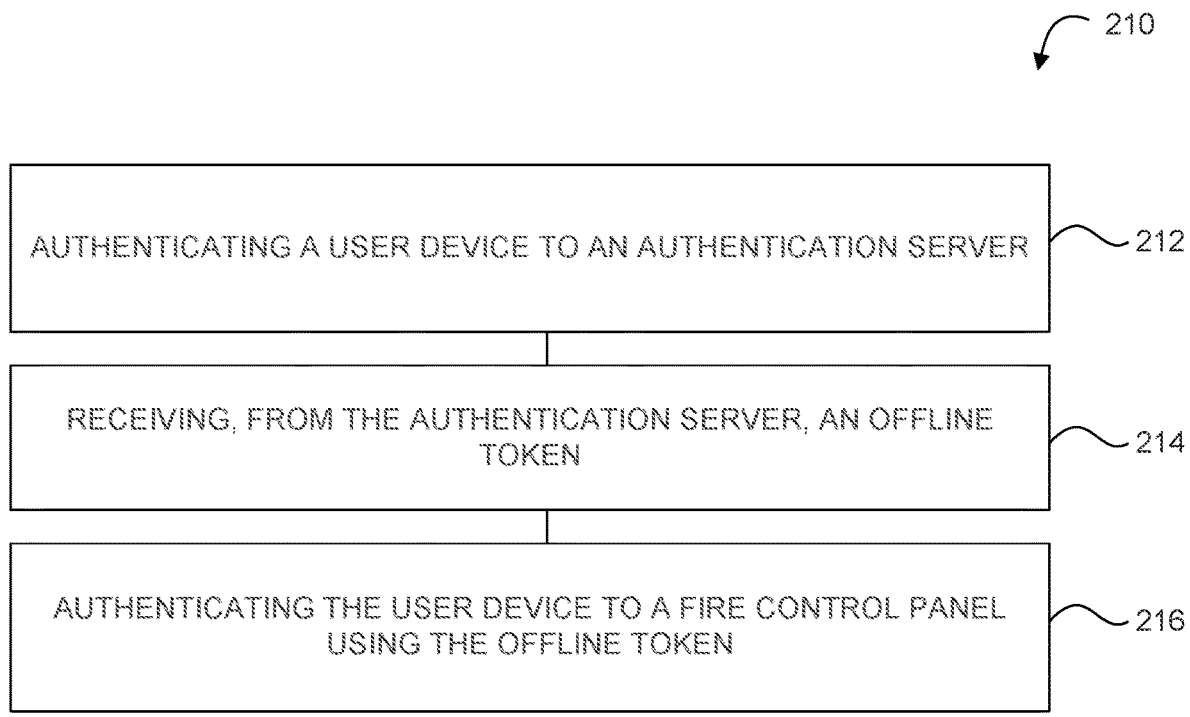
FIG. 2 is a method for fire control system authentication in accordance with one or more embodiments of the present disclosure.

FIG. 2 is a method 210 for fire control system authentication in accordance with one or more embodiments of the present disclosure. At 212, the method 210 includes authenticating a user device to an authentication server. At 214, the method 210 incudes receiving, from the authentication server, an offline token. At 216, the method 210 includes authenticating the user device to a fire control panel using the offline token. As previously discussed, in some embodiments, the fire control panel may not have a connection to the Internet.

Figure 3:
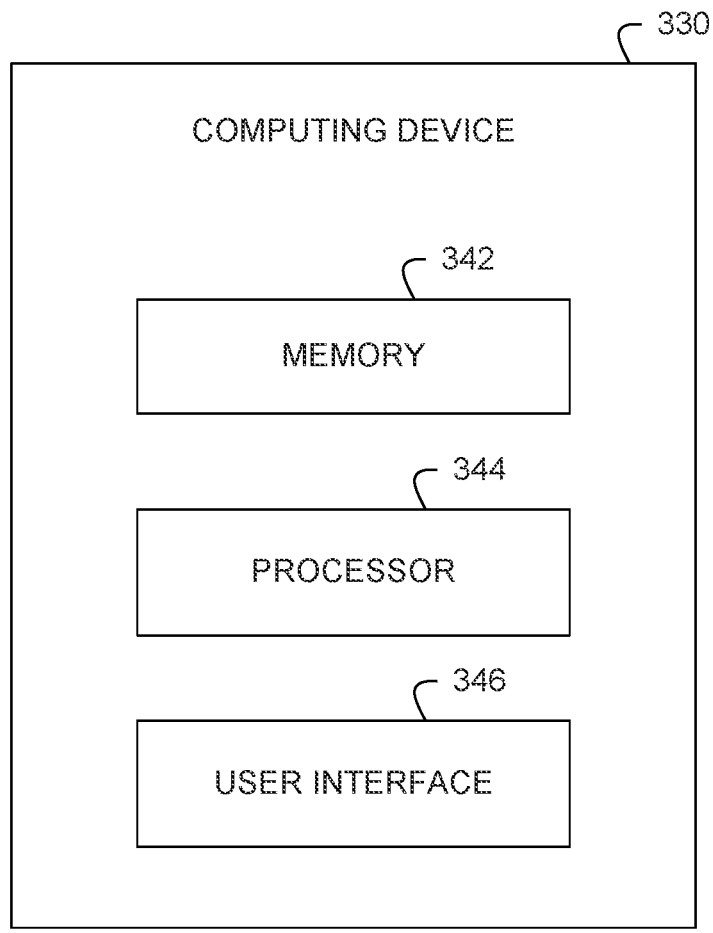
FIG. 3 illustrates an example of a computing device associated with fire control system authentication in accordance with an embodiment of the present disclosure.

FIG. 3 illustrates an example of a computing device 330 associated with fire control system authentication in accordance with an embodiment of the present disclosure. Computing device 330 can be, for instance, user device 102, authentication server 104, and/or fire control panel 106, previously described herein in connection with FIG. 1.

As shown in FIG. 3, computing device 330 can include a processor 344 and a memory 342. Memory 342 can be any type of storage medium that can be accessed by processor 344 to perform various examples of the present disclosure. For example, memory 342 can be a non-transitory computer readable medium having computer readable instructions (e.g., computer program instructions) stored thereon that are executable by processor 344 to perform various examples of the present disclosure. That is, processor 344 can execute the executable instructions stored in memory 342 to perform various examples in accordance with the present disclosure.

As previously discussed, memory 342 can be volatile or nonvolatile memory. Memory 342 can also be removable (e.g., portable) memory, or non-removable (e.g., internal) memory. For example, memory 342 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 342 is illustrated as being located in computing device 330, embodiments of the present disclosure are not so limited. For example, memory 342 can also be located internal to another computing resource (e.g., enabling computer readable instructions to be downloaded over the Internet or another wired or wireless connection).

As shown in FIG. 3, computing device 330 can include a user interface 346. A user (e.g., operator) of computing device 330 can interact with computing device 330 via user interface 346. For example, user interface 346 can provide (e.g., display) information to and/or receive information from (e.g., input by) the user of computing device 330.

In some embodiments, user interface 346 can be a graphical user interface (GUI) that can include a display (e.g., a screen) that can provide information to, and/or receive information from, the user of computing device 330. The display can be, for instance, a touch-screen (e.g., the GUI can include touch-screen capabilities). As an additional example, user interface 346 can include a keyboard and/or mouse that the user can use to input information into computing device 330, and/or a speaker that can play audio to, and/or receive audio (e.g., voice input) from, the user. Embodiments of the present disclosure, however, are not limited to a particular type(s) of user interface.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for fire control system authentication, comprising:
   authenticating a user device to an authentication server;
   receiving, from the authentication server, an offline token, wherein the offline token includes a role associated with a user of the user device, and wherein the role associated with the user of the user device indicates an ability for the user to modify configuration data of a fire control panel and devices of a fire control network to which the fire control panel belongs; and
   authenticating the user device to the fire control panel using the offline token.

2. The method of claim 1, wherein the fire control panel lacks an internet connection.

3. The method of claim 1, wherein authenticating the user device to the authentication server includes:
   receiving user credentials input to the user device;
   receiving, from the authentication server, an access token and an identification token responsive to a determination that the user credentials are valid.

4. The method of claim 3, wherein the method includes creating the offline token by the authentication server responsive to a successful validation of the access token and the identification token against the authentication server.

5. The method of claim 1, wherein the method includes storing the offline token by the user device.

6. The method of claim 1, wherein the offline token has an operational lifetime.

7. The method of claim 6, wherein the method includes:
   attempting to authenticate the user device to the fire control panel using the offline token;
   denying authentication of the user device to the fire control panel responsive to a determination that the offline token has exceeded its operational lifetime.

8. The method of claim 1, wherein the method includes signing the offline token with a digital certificate associated with an entity managing the fire control panel.

9. A system for fire control system authentication, comprising:
   a user device;
   an authentication server; and
   a fire control panel;
   wherein:
      the authentication server is configured to send the user device an offline token responsive to authenticating the user device to the authentication server, wherein the offline token includes a role associated with a user of the user device, and wherein the role associated with the user of the user device indicates an ability for the user to modify configuration data of the fire control panel and devices of a fire control network to which the fire control panel belongs;
      the user device is configured to store the offline token;
      the fire control panel is configured to authenticate the user device using the offline token without a network connection; and
      the user device is configured to thereafter modify operations of the fire control panel.

10. The system of claim 9, wherein the offline token includes: a name associated with a user of the user device; an address associated with the user of the user device; an identifier associated with the user of the user device; and an entity employing the user of the user device.

11. The system of claim 9, wherein the role associated with the user of the user device indicates an ability for the user to modify a time setting associated with the fire control panel.

12. The system of claim 9, wherein the role associated with the user of the user device indicates an ability for the user to view an event log associated with the fire control panel.

13. The system of claim 9, wherein the offline token includes an indication of an ability for the user to designate an entity allowed to perform operations of the fire control panel.

14. The system of claim 9, wherein the fire control panel is configured to authenticate the user device via a network connection.

15. The system of claim 14, wherein the fire control panel is configured to verify the validity of the offline token via the network connection.

16. A non-transitory machine-readable medium having instructions stored thereon which, when executed by a processor, cause the processor to:
   authenticate a user device to an authentication server;
   receive an offline token from the authentication server, wherein the offline token includes a role associated with a user of the user device, and wherein the role associated with the user of the user device indicates an ability for the user to modify configuration data of a fire control panel and devices of a fire control network to which the fire control panel belongs;
store the offline token in memory; and
authenticate the user device to the fire control panel absent an Internet connection using the offline token.

17. The medium of claim 16, including instructions to provide a notification associated with an operational lifetime of the offline token.

18. The medium of claim 17, wherein the operational lifetime of the offline token is seven days.

19. The medium of claim 16, wherein the user device is a smart phone.

\* \* \* \* \*